US011004410B2

(12) United States Patent
Kim et al.

(10) Patent No.: US 11,004,410 B2
(45) Date of Patent: May 11, 2021

(54) DISPLAY DEVICE

(71) Applicant: Samsung Display Co., Ltd., Yongin-si (KR)

(72) Inventors: Jinpil Kim, Suwon-si (KR); Hoisik Moon, Hwaseong-si (KR); Byoung Seok Yoo, Seoul (KR); Youngsuk Ha, Gunpo-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/576,576

(22) Filed: Sep. 19, 2019

(65) Prior Publication Data

US 2020/0152142 A1 May 14, 2020

(30) Foreign Application Priority Data

Nov. 14, 2018 (KR) ........................ 10-2018-0139743

(51) Int. Cl.
*G06F 1/00* (2006.01)
*G09G 3/36* (2006.01)

(52) U.S. Cl.
CPC ... *G09G 3/3607* (2013.01); *G09G 2300/0443* (2013.01); *G09G 2320/0673* (2013.01)

(58) Field of Classification Search
None
See application file for complete search history.

(56) References Cited

U.S. PATENT DOCUMENTS

2012/0139937 A1* 6/2012 Marcu .................. G09G 3/2003 345/590
2013/0076803 A1* 3/2013 Lee ...................... G09G 3/3233 345/690
2014/0225942 A1* 8/2014 Liu ......................... G09G 3/36 345/694
2015/0371579 A1* 12/2015 Yu ........................ G09G 3/2003 345/690

FOREIGN PATENT DOCUMENTS

KR 10-2008-0067843 A 7/2008
KR 10-2012-0072724 A 7/2012

* cited by examiner

*Primary Examiner* — Michael A Faragalla
(74) *Attorney, Agent, or Firm* — Lewis Roca Rothgerber Christie LLP

(57) ABSTRACT

A display device includes a display panel including a first sub-pixel and a second sub-pixel, a gamma generator configured to change a dividing ratio of a high gamma curve and a low gamma curve applied to the high sub-pixel and the low sub-pixel based on a position of the first sub-pixel and to generate a high gamma data corresponding to the high gamma curve and a low gamma data corresponding to the low gamma curve, and a data driver configured to convert the high gamma data and the low gamma data to a high data voltage and a low data voltage.

20 Claims, 14 Drawing Sheets

310

| REGION | DIVIDING RATIO (DR) |
|---|---|
| 1ST REGION | 50% |
| 2ND REGION | 100% |

320

| DIVIDING RATIO (DR) | HIGH GAMMA CURVE (HGC) | LOW GAMMA CURVE (LGC) |
|---|---|---|
| 50% | 2.4 | 2.0 |
| 100% | 2.8 | 1.6 |

FIG. 11

520

| REGION | DIVIDING RATIO (DR) |
|---|---|
| 1ST REGION | 50% |
| 2ND REGION | 0% |

FIG. 12

540

| DIVIDING RATIO (DR) | HIGH GAMMA CURVE (HGC) | LOW GAMMA CURVE (LGC) |
|---|---|---|
| 0% | 2.2 | 2.2 |
| 50% | 2.4 | 2.0 |

FIG. 16

720

| LUMINANCE AMOUNT(LA) | DIVIDING RATIO (DR) |
|---|---|
| L1 | 0% |
| L2 | 50% |
| L3 | 100% |

FIG. 17

730

| DIVIDING RATIO (DR) | HIGH GAMMA CURVE (HGC) | LOW GAMMA CURVE (LGC) |
|---|---|---|
| 0% | 2.2 | 2.2 |
| 50% | 2.4 | 2.0 |
| 100% | 2.8 | 1.6 |

DISPLAY DEVICE

CROSS-REFERENCE TO RELATED APPLICATION

This application claims priority to and the benefit of Korean Patent Application No. 10-2018-0139743, filed on Nov. 14, 2018 in the Korean Intellectual Property Office (KIPO), the content of which is incorporated herein in its entirety by reference.

BACKGROUND

1. Field

Example embodiments relate generally to a display device.

2. Description of the Related Art

A liquid crystal display (LCD) panel includes a first substrate including a pixel electrode, a second substrate including a common electrode, and a liquid crystal layer disposed between the first substrate and the second substrate. An electric field is generated by voltages applied to the pixel electrode and the common electrode. By adjusting an intensity of the electric field, the transmittance of light passing through the liquid crystal layer may be controlled so that an image may be displayed.

In the case of a large liquid crystal display device or a curved display device (of which a liquid crystal display panel is formed as a curved line), side visibility is lowered compared with front visibility. A technique of spatial dividing pixel (SDP) for driving a pixel formed on the liquid crystal display panel in a spatially and temporally divided manner is studied in order to improve the side visibility.

SUMMARY

Aspects of some example embodiments are directed toward a display device capable of improving display quality.

In example embodiments, a display device may include a display panel including a plurality of first sub-pixels, a first sub-pixel of the plurality of first sub-pixels comprising a high sub-pixel and a low sub-pixel, a gamma generator configured to change a dividing ratio of a high gamma curve and a low gamma curve applied to the high sub-pixel and the low sub-pixel based on a position of the first sub-pixel and to generate a high gamma data corresponding to the high gamma curve and a low gamma data corresponding to the low gamma curve, and a data driver configured to convert the high gamma data and the low gamma data to a high data voltage and a low data voltage.

In example embodiments, the high sub-pixel and the low sub-pixel may be alternately arranged in a first direction and the high sub-pixel and the low sub-pixel are alternately arranged in a second direction crossing the first direction.

In example embodiments, the gamma generator may divide the display panel into a plurality of regions and may generate a dividing ratio of the high gamma curve and the low gamma curve which is different for each region of the plurality of regions and may apply the high gamma curve and the low gamma curve to the high sub-pixel and the low sub-pixel in each of the regions.

In example embodiments, the gamma generator may generate a dividing ratio of the high gamma curve and the low gamma curve applied to the high sub-pixel and the low sub-pixel at a center of the display panel to have a lower value than the dividing ratio of the high gamma curve and the low gamma curve applied to the high sub-pixel and the low sub-pixel at an outer edge of the display panel.

In example embodiments, the gamma generator may gradually change the dividing ratio of the high gamma curve and the low gamma curve based on the position of the first sub-pixel.

In example embodiments, the display panel further may include a second sub-pixel having a high region and a low region.

In example embodiments, the first sub-pixel may be in a first region of the display panel and the second sub-pixel is in a second region of the display panel.

In example embodiments, the first sub-pixel may be at a center of the display panel and the second sub-pixel may be at an outer edge of the display panel.

In example embodiments, the gamma generator may generate the high gamma data and the low gamma data based on the high gamma curve and the low gamma curve of which the dividing ratio is zero, and the data driver may generate the high data voltage and the low data voltage having the same level based on the high gamma data and the low gamma data and may provide one of the high data voltage and the low data voltage to the second sub-pixel.

In example embodiments, the gamma generator may include a dividing ratio lookup table configured to store the dividing ratio corresponding to the position of the first sub-pixel and a gamma curve lookup table configured to store the high gamma curve and the low gamma curve corresponding to the dividing ratio.

In example embodiments, the gamma generator may include a high gamma lookup table configured to store the high gamma data for each gray level based on the high gamma curve and a low gamma lookup table configured to store the low gamma data for each gray level based on the low gamma curve.

In example embodiments, the gamma generator further may include a color detector configured to convert an image data in hue saturation value (HSV) color space and to output a color dividing control signal to control the dividing ratio of a region that corresponds to HSV data detected based on a set analyzing condition.

In example embodiments, the gamma generator may control the dividing ratio of the high gamma curve and the low gamma curve based on the color dividing control signal.

In example embodiments, a display device may include a display panel including a sub-pixel that includes a high sub-pixel and a low sub-pixel, a gamma generator configured to receive an image data per frame, to change a dividing ratio of a high gamma curve and a low gamma curve applied to the high sub-pixel and the low sub-pixel based on a luminance amount of the image data, and to generate high gamma data corresponding to the high gamma curve and low gamma data corresponding to the low gamma curve, and a data driver configured to convert the high gamma data and the low gamma data to a high data voltage and a low data voltage.

In example embodiments, the gamma generator may increase the dividing ratio of the high gamma curve and the low gamma curve as the luminance amount of the image data increases.

In example embodiments, the gamma generator may assign a weight according to a color of the image data.

In example embodiments, the gamma generator may analyze the luminance amount of the image data through a histogram analysis.

In example embodiments, the gamma generator include a luminance detector configured to detect the luminance amount of the image data, a dividing ratio lookup table configured to store the dividing ratio corresponding to the luminance amount of the image data, and a gamma curve lookup table configured to store the high gamma curve and the low gamma curve corresponding to the dividing ratio.

In example embodiments, the gamma generator include a high gamma lookup table configured to store the high gamma data for each gray level based on the high gamma curve and a low gamma lookup table configured to store the low gamma data for each gray level based on the low gamma curve.

In example embodiments, the gamma generator further may include a color detector configured to convert the image data in hue saturation value (HSV) color space and may output a color dividing control signal to control the dividing ratio of a region that corresponds to HSV data detected based on a set analyzing condition. The gamma generator may control the dividing ratio of the high gamma curve and the low gamma curve based on the color dividing control signal.

Therefore, the display device according to example embodiments may include the first sub-pixels including the high sub-pixel and the low sub-pixel and increase the dividing ratio of the high gamma curve and the low gamma curve applied to the high sub-pixel and the low sub-pixel disposed at the outer edge of the display panel. Thus, a visibility (e.g., image visibility) of the outer edge of the display panel and display quality may improve.

The display device according to example embodiments may form the first sub-pixel including the high sub-pixel and the low sub-pixel at the center of the display panel and the second sub-pixel including the high region and the low region at the outer edge of the display panel, and control the dividing ratio of the high gamma curve and the low gamma curve in each of the regions. Thus, a visibility of the outer edge of the display panel and display quality (e.g., resolution) of the center of the display panel may improve.

The display device according to example embodiments may include the sub-pixels including the high sub-pixel and the low sub-pixel and control the dividing ratio of the high gamma curve and the low gamma curve based on the luminance amount of an image data. Thus, display quality of the display device may improve.

BRIEF DESCRIPTION OF THE DRAWINGS

Illustrative, non-limiting example embodiments will be more clearly understood from the following detailed description taken in conjunction with the accompanying drawings.

FIG. 11 is a chart illustrating a dividing ratio lookup table included in the gamma generator of FIG. 7 according to example embodiments.

FIG. 12 is a chart illustrating a gamma curve lookup table included in the gamma generator of FIG. 7 according to example embodiments.

FIG. 16 is a chart illustrating a dividing ratio lookup table included in the gamma generator of FIG. 15 according to example embodiments.

FIG. 17 is a chart illustrating a gamma curve lookup table included in the gamma generator of FIG. 15 according to example embodiments.

DETAILED DESCRIPTION

Hereinafter, the present inventive concept will be explained in more detail with reference to the accompanying drawings.

Figure 1:
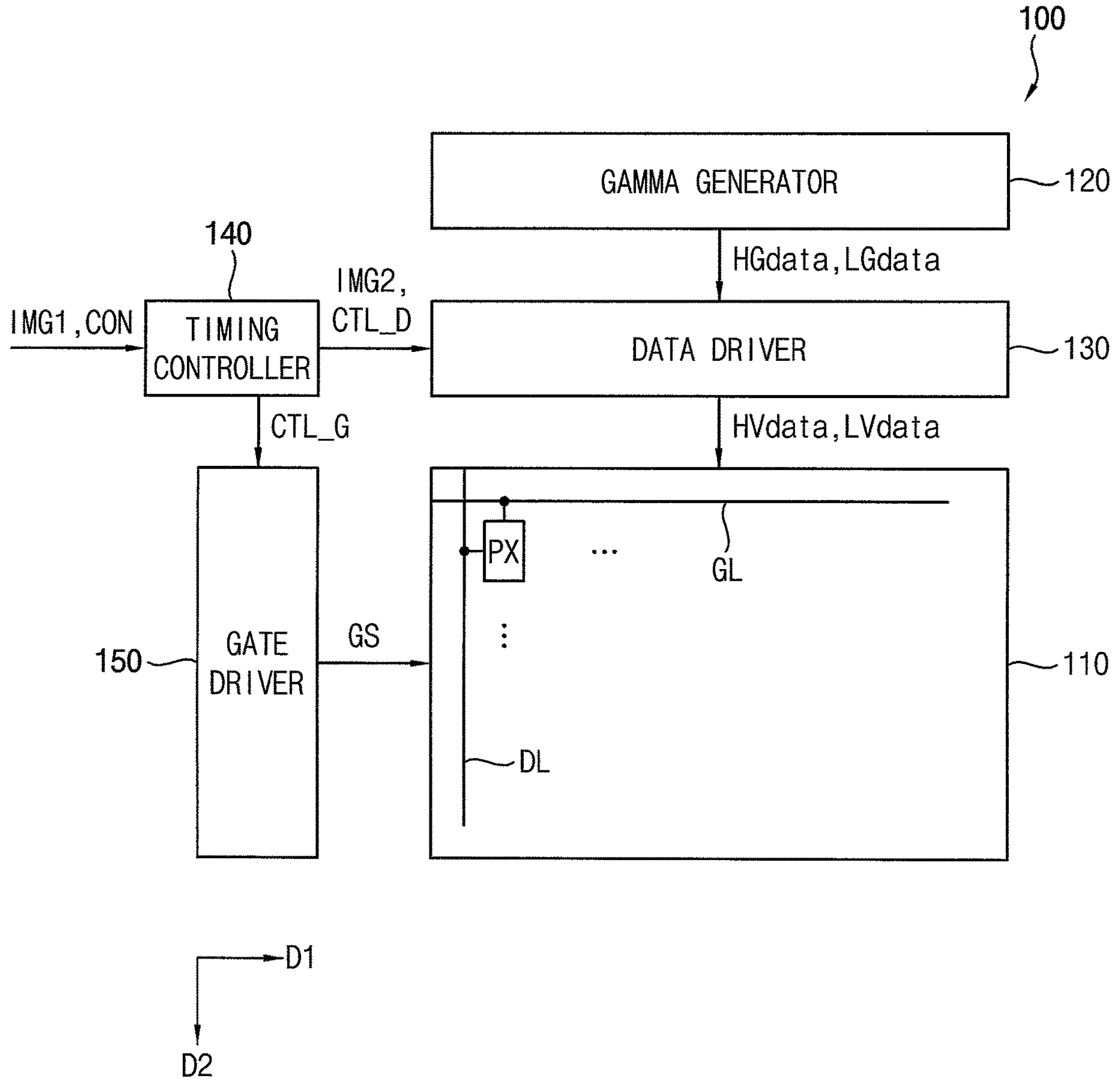
FIG. 1 is a block diagram illustrating a display device according to example embodiments.

FIG. 1 is a block diagram illustrating a display device according to example embodiments.

Referring to FIG. 1, a display device 100 may include a display panel 110, a gamma generator 120, a data driver 130, a timing controller 140, and a gate driver 150.

The display panel 110 may include a plurality of data lines DL, a plurality of gate lines GL, and a plurality of pixels PX. Each of the pixels PX may be electrically coupled to the gate line GL and the data line DL. The gate lines GL may extend in a first direction D1 and be arranged with each other in a second direction D2 perpendicular to or crossing the first direction D1. The data lines DL may extend in the second direction D2 and be arranged with each other in the first direction D1. The first direction D1 may be parallel with a long side of the display panel 110, and the second direction D2 may be parallel with a short side of the display panel 110.

In some example embodiments, the display panel 110 may include first sub-pixels, each first sub-pixel may include a high sub-pixel and a low sub-pixel. For example, each of the pixels of the plurality of pixels may include at least one first sub-pixel. For example, each of the high sub-pixel and the low sub-pixel may display or emit one selected from a red color light, a green color light, and a blue color light. Alternatively, each of the high sub-pixel and the low sub-pixel may display or emit one selected from a red color light, a green color light, a blue color light, and a white color light. The high sub-pixel of the first sub-pixel may emit light in response to a high data voltage HVdata from the data driver 130. The low sub-pixel of the first sub-pixel may emit light in response to a low data voltage LVdata from the data driver 130. When a difference between the high data voltage HVdata provided to the high sub-pixel and the low data voltage LVdata provided to the low sub-pixel increases in order to improve side visibility of an outer edge of the display panel 110, an image displayed on a center of the display panel 110 may become distorted. The display device 100 according to example embodiments may improve display quality of the center of the display panel 110 and the side visibility of the outer edge of the display panel 110 by changing a dividing ratio of a high gamma curve and a low gamma curve based on a position of the first sub-pixel. Hereinafter, the display device 100 will be described in more detail.

The gamma generator 120 may change the dividing ratio of the high gamma curve and the low gamma curve applied to the high sub-pixel and the low sub-pixel according to the position of the first sub-pixel. The gamma generator 120 may generate a high gamma data HGdata corresponding to the high gamma curve and a low gamma data LGdata corresponding to the low gamma curve. Here, the dividing ratio indicates a degree to which the high gamma curve and the low gamma curve are separated. That is, when the dividing ratio is 0%, the high gamma curve and the low gamma curve may coincide (i.e., the high gamma curve and the low gamma curve may be the same). When the dividing ratio increases, the difference between the high gamma curve and the low gamma curve may increase. In some example embodiments, the gamma generator 120 may divide the display panel 110 into a plurality of regions. The gamma generator 120 may apply the high gamma curve and the low gamma curve of which the dividing ratio is different to the high sub-pixel and the low sub-pixel formed in each of the regions. For example, the gamma generator 120 may divide the display panel 110 into a center region and an outer edge region and may generate the dividing ratio of the high gamma curve and the low gamma curve applied to the high sub-pixel and the low sub-pixel formed in the center region to have a lower value than the dividing ratio of the high gamma curve and the low gamma curve applied to the high sub-pixel and the low sub-pixel formed in the outer edge region. In other example embodiments, the gamma generator may gradually change the dividing ratio of the high gamma curve and the low gamma curve according to the position of the first sub-pixel. For example, the gamma generator may gradually increase the dividing ratio of the high gamma curve and the low gamma curve from the center region to the outer edge region of the display panel 110.

In other example embodiments, the display panel 110 may further include second sub-pixels, each second sub-pixel may include a high region and a low region. For example, each of the pixels may include at least one second sub-pixel. For example, the second sub-pixel may display one selected from a red color light, a green color light, and a blue color light. Alternatively, the second sub-pixel may display or emit one of a red color light, a green color light, a blue color light, and a white color light. The high region and the low region of the second sub-pixel may emit light with different luminance values by dividing the data voltage provided through the data line. The first sub-pixel may be formed in a first region of the display panel 110 and the second sub-pixel may be formed in a second region of the display panel 110. For example, the first region may be the center of the display panel 110 and the second region may be the outer edge of the display panel 110.

The gamma generator 120 may apply the high gamma curve and the low gamma curve having different dividing ratios to the first sub-pixel and the second sub-pixel. For example, the gamma generator 120 may apply the high gamma curve and the low gamma curve of which the dividing ratio is 50% to the first sub-pixel and may apply the high gamma curve and the low gamma curve of which the dividing ratio is 0% to the second sub-pixel. When the dividing ratio of the high gamma curve and the low gamma curve is 0%, the high gamma curve and the low gamma curve may coincide. Further, the gamma generator 120 may gradually increase the dividing ratio of the high gamma curve and the low gamma curve from the center to the outer edge of the display panel 110.

The gamma generator 120 may generate the high gamma data HGdata corresponding to the high gamma curve and the low gamma data LGdata corresponding to the low gamma curve. The gamma generator 120 may provide the high gamma data HGdata and the low gamma data LGdata to the data driver 130.

The data driver 130 may convert the high gamma data HGdata and the low gamma data LGdata to a high data voltage HVdata and the low data voltage LVdata. The data driver 130 may generate the high data voltage HVdata based on a second image data IMG2 and the high gamma data HGdata and may generate the low data voltage LVdata based on the second image data IMG2 and the low gamma data LGdata. Here, as the dividing ratio of the high gamma curve and the low gamma curve increases, a difference between the high data voltage HVdata and the low data voltage LVdata may increase. In some example embodiments, the data driver 130 may provide the high data voltage HVdata to the high sub-pixel of the first sub-pixel and may provide the low data voltage LVdata to the low sub-pixel of the first sub-pixel. In other example embodiments, the data driver 130 may generate the high data voltage HVdata and the low data voltage LVdata having the same voltage level based on the high gamma data HGdata and the low gamma data LGdata generated based on the high gamma curve and the low gamma curve of which the dividing ratio is 0%, and may provide one selected from the high data voltage HVdata and the low data voltage LVdata to the second sub-pixel.

The timing controller 140 may convert a first image data from an external device to the second image data IMG2 and may generate a data control signal CTL_D and the gate control signal CTL_G to control a driving of the second image data IMG2. The timing controller 140 may convert the first image data IMG1 from the external device to the second image data IMG2 by applying an algorithm (e.g., dynamic capacitance compensation (DCC)) that compensates the display quality of the first image data IMG1. When the timing controller 140 does not include the algorithm for compensating the display quality, the first image data IMG1 may be output as the second image data IMG2. The timing controller 140 may provide the second image data IMG2 to the data driver 130. The timing controller 140 may receive a control signal CON from the external device and may generate the data control signal CTL_D provided to the data driver 130 and the gate control signal CTL_G provided to the gate driver 150. The data control signal CTL_D may include a horizontal start signal and at least one clock signal. The gate control signal CTL_G may include a vertical start signal and at least one clock signal.

Although the display device 100 including the gamma generator 120, the data driver 130, and the timing controller 140 is described in FIG. 1, the display device 100 is not limited thereto. For example, the gamma generator 120 may be located in the timing controller 140 or be located in the data driver 130.

The gate driver 150 may generate a gate signal GS based on the gate control signal CTL_G from the timing controller 140. The gate driver 150 may provide the gate signal GS to the first sub-pixels formed in the display panel 110 through the gate line GL. Further, the gate driver 150 may provide the gate signal GS to the first sub-pixel and the second sub-pixel.

As described above, the display device 100 according to example embodiments may improve the visibility of the outer edge of the display panel by including the first sub-pixels that includes the high sub-pixel and the low sub-pixel and increasing the dividing ratio of the high gamma curve and the low gamma curve applied to the high sub-pixel and the low sub-pixel of the first sub-pixel formed in the outer edge of the display panel 110. Further, the display device 100 according to example embodiments may prevent or reduce the display quality (e.g., resolution) degradation caused in the center of the display panel by applying a pixel division driving method by decreasing the dividing ratio of the high gamma curve and the low gamma curve applied to the high sub-pixel and the low sub-pixel of the first sub-pixel formed in (at) the center of the display panel 110. Further, the display device 100 according to example embodiments may improve the visibility (e.g., display visibility) of the outer edge of the display panel 110 and the display quality of the center of the display panel 110 by forming the first sub-pixel including the high sub-pixel and the low sub-pixel in the center of the display panel 110 and forming the second sub-pixel including the high region and the low region in (at) the outer edge of the display panel 110.

Figure 2:
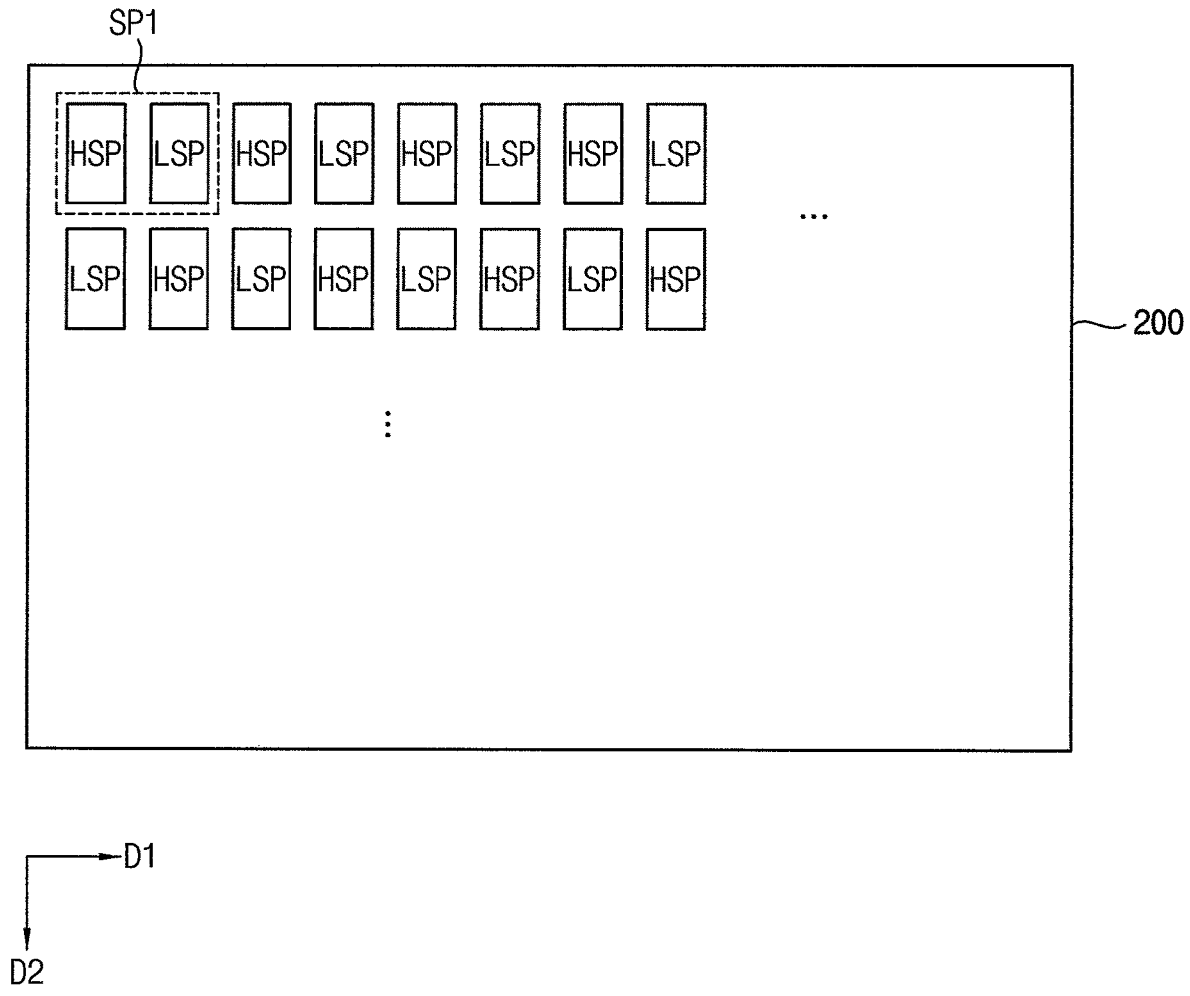
FIG. 2 is a diagram illustrating a display panel included in the display device of FIG. 1 according to example embodiments.
Figure 3A:
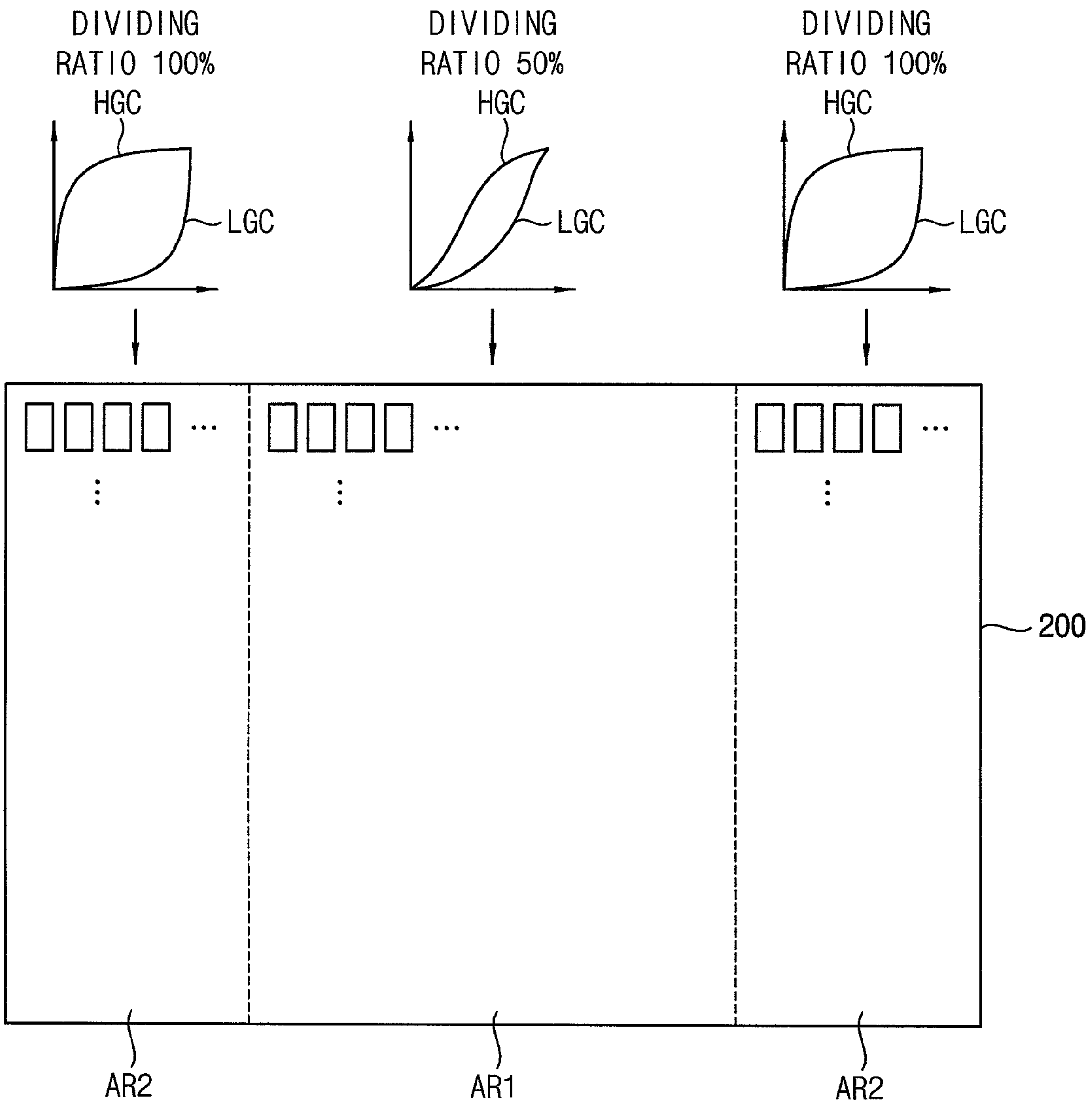
FIGS. 3A-3B are diagrams illustrating an operation of a gamma generator included in the display device of FIG. 1 according to example embodiments.
Figure 3B:
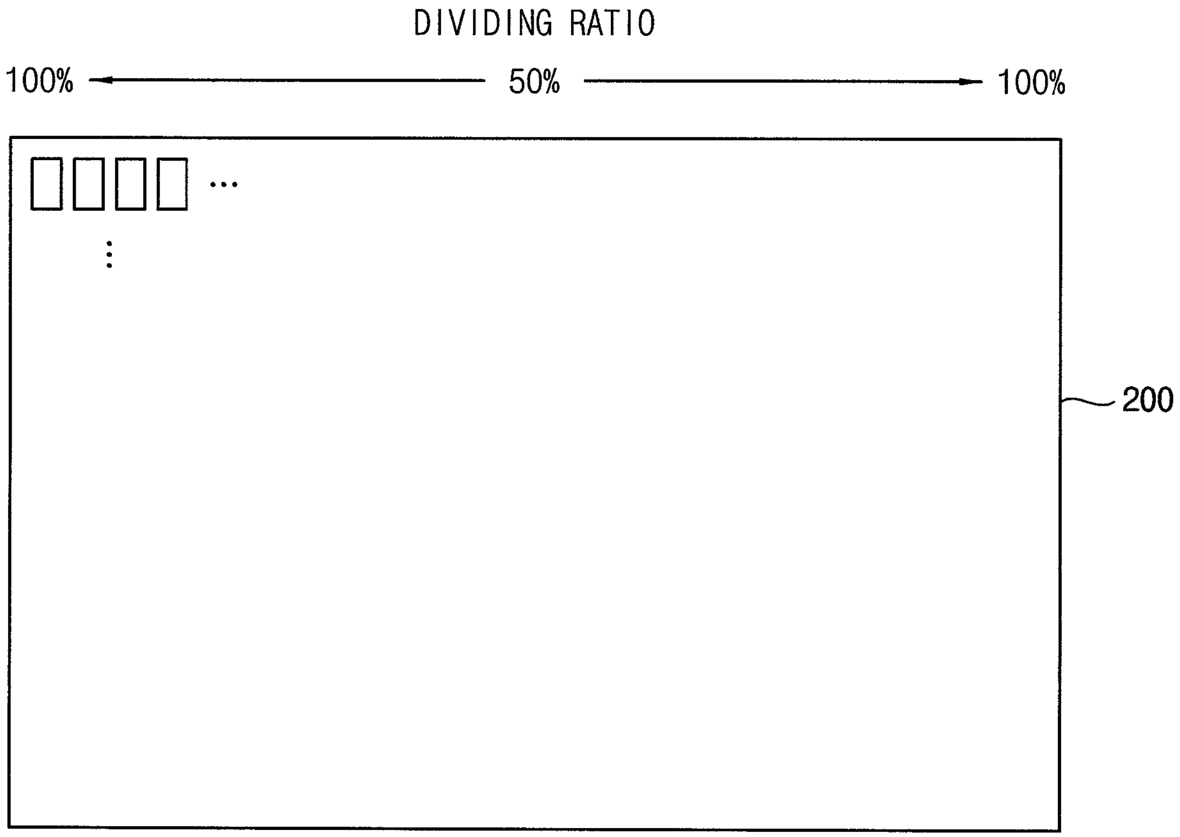

FIG. 2 is a diagram illustrating a display panel included in the display device of FIG. 1 according to example embodiments. FIGS. 3A-3B are diagrams illustrating an operation of a gamma generator included in the display device of FIG. 1 according to example embodiments.

Referring to FIG. 2, the display panel 200 may include the first sub-pixels SP1. Each of the first sub-pixels may include the high sub-pixel HSP and the low sub-pixel LSP. For example, each of the high sub-pixel HSP and the low sub-pixel LSP of the first sub-pixel SP1 may display or emit one selected from a red color light, a green color light, and a blue color light. Alternatively, each of the high sub-pixel HSP and the low sub-pixel LSP of the first sub-pixel SP1 may display or emit one selected from a red color light, a green color light, a blue color light, and a white color light. The high sub-pixel HSP and the low sub-pixel LSP may be alternately formed in the first direction D1. The high sub-pixel HSP and the low sub-pixel LSP may be alternately formed in the second direction D2 perpendicular to the first direction D1. The high sub-pixel HSP may emit light in response to the high data voltage provided from the data driver, and the low sub-pixel may emit light in response to the low data voltage provided from the data driver.

Referring to FIG. 3A, the gamma generator may divide the display panel 200 into a plurality of regions. For example, the gamma generator may divide the display panel 200 into a first region AR1 corresponding to the center of the display panel 200 and second regions AR2 corresponding to the outer edge of the display panel 200. The gamma generator may generate the dividing ratio of the high gamma curve HGC and the low gamma curve LGC applied to the high sub-pixel HSP and the low sub-pixel LSP formed in the first area AR1 to have a lower value than the dividing ratio of the high gamma curve HGC and the low gamma curve LGC applied to the high sub-pixel HSP and the low sub-pixel LSP formed in the second area AR2. For example, the gamma generator may apply the high gamma curve HGC and the low gamma curve LGC of which the dividing ratio is 50% to the high sub-pixel HSP and the low sub-pixel LSP formed in the first region AR1 and may apply the high gamma curve HGC and the low gamma curve LGC of which the dividing ratio is 100% to the high sub-pixel HSP and the low sub-pixel LSP formed in the first region AR2.

Referring to FIG. 3B, the gamma generator may gradually change the dividing ratio of the high gamma curve HGC and the low gamma curve LGC according to the position of the first sub-pixel SP1. For example, the gamma generator may apply the high gamma curve HGC and the low gamma curve LGC of the dividing ratio is 50% to the high sub-pixel HSP and the low sub-pixel LSP of the first sub-pixel SP1 formed in the center of the display panel and gradually increase the dividing ratio toward the outer edge of the display panel 200.

As described above, the gamma generator may reduce the image distortion in the center of the display panel 200 and improve the visibility of the outer edge of the display panel 200 by applying the high gamma curve HGC and the low gamma curve LGC of which the dividing ratio is changed according to the position of the display panel 200.

Figures 4, 5:
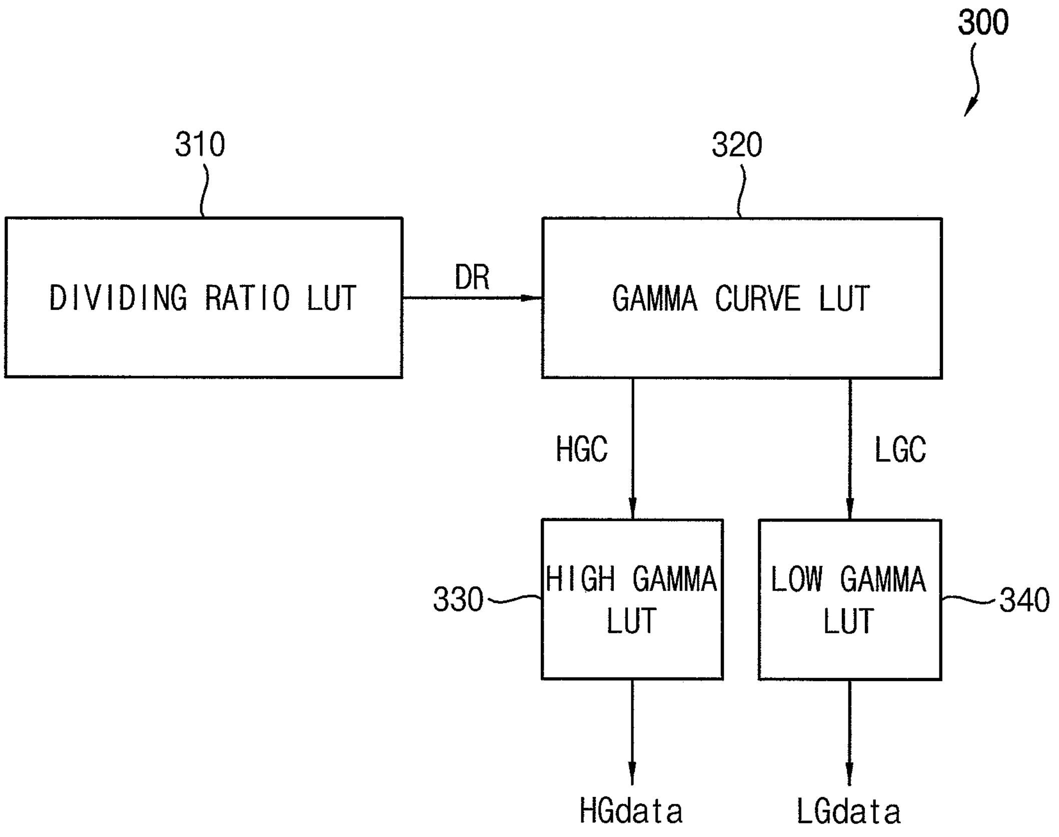
FIG. 4 is block diagram illustrating a gamma generator included in the display device of FIG. 1 according to example embodiments.
FIG. 5 is a chart illustrating a dividing ratio lookup table included in the gamma generator of FIG. 4 according to example embodiments.
Figures 6, 7:
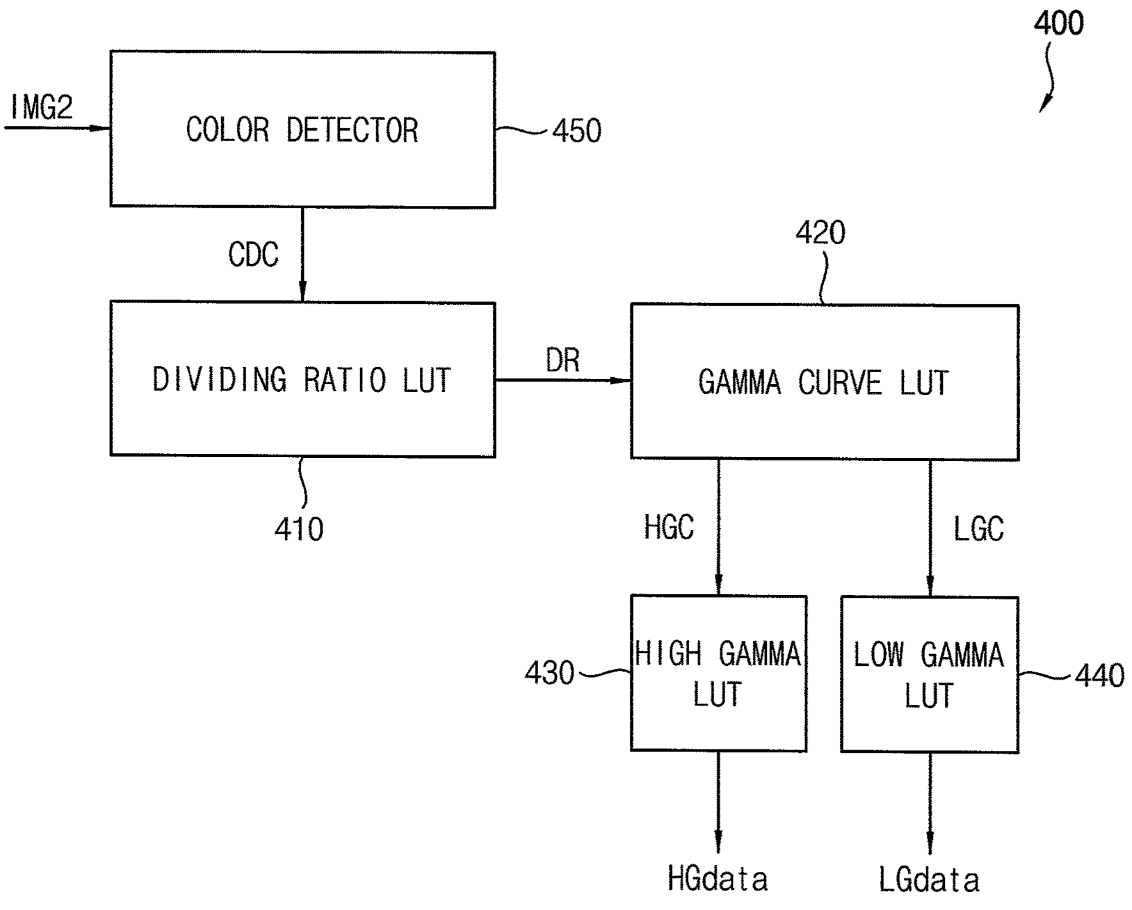
FIG. 6 is a chart illustrating a gamma curve lookup table included in the gamma generator of FIG. 4 according to example embodiments.
FIG. 7 is a block diagram illustrating a gamma generator included in the display device of FIG. 1 according to example embodiments.

FIG. 4 is block diagram illustrating a gamma generator included in the display device of FIG. 1 according to example embodiments. FIG. 5 is a chart illustrating a dividing ratio lookup table included in the gamma generator of FIG. 4 according to example embodiments. FIG. 6 is a chart illustrating a gamma curve lookup table included in the gamma generator of FIG. 5 according to example embodiments.

Referring to FIG. 4, the gamma generator 300 may include a dividing ratio lookup table (LUT) 310, a gamma curve lookup table 320, a high gamma lookup table 330, and a low gamma lookup table 340. The gamma generator 300 of FIG. 4 may correspond to the gamma generator 120 included in the display device 100 of FIG. 1.

The dividing ratio lookup table 310 may store the dividing ratio DR according to the position of the high sub-pixel and the low sub-pixel. Referring to FIG. 5, the dividing ratio lookup table 310 may store the dividing ratio DR when the high sub-pixel and the low sub-pixel are formed in the first region or the second region. For example, when the high sub-pixel and the low sub-pixel are formed in the first region, the gamma generator 300 may select the dividing ratio of 50% and when the high sub-pixel and the low sub-pixel are formed in the second region, the gamma generator 300 may select the dividing ratio of 100%. Further, when the high sub-pixel and the low sub-pixel are formed between the first region and the second region, the gamma generator 300 may select the dividing ratio that interpolates the dividing ratio corresponding to the first region and the dividing ratio corresponding to the second region.

The gamma curve lookup table 320 may store the high gamma curve HGC and the low gamma curve LGC corresponding to the dividing ratio. Referring to FIG. 6, the gamma curve lookup table 320 may store the high gamma curve HGC and the low gamma curve LGC when the dividing ratios are 50% and 100%. For example, when the dividing ratio is 50%, the gamma generator may select the high gamma curve HGC of which the gamma curve is 2.4 and the low gamma curve LGC of which the gamma curve is 2.0. Further, when the dividing ratio is 100%, the gamma generator may select the high gamma curve HGC of which the gamma curve is 2.8 and the low gamma curve LGC of which the gamma curve is 1.6.

The high gamma lookup table 330 may store the high gamma data HGdata for each gray level based on the high gamma curve HGC. The high gamma lookup table 330 may output the high gamma data HGdata for each gray level to the data driver based on the high gamma curve HGC having the gamma curve selected in the gamma curve lookup table 320.

The low gamma lookup table 340 may store the low gamma data LGdata for each gray level based on the low gamma curve LGC. The low gamma lookup table 340 may output the low gamma data LGdata for each gray level to the data driver based on the low gamma curve LGC having the gamma curve selected in the gamma curve lookup table 320.

FIG. 7 is a block diagram illustrating other example of a gamma generator included in the display device of FIG. 1.

Referring to FIG. 7, the gamma generator 400 may include a color detector 450, the dividing ratio lookup table 410, the gamma curve lookup table 420, the high gamma lookup table 430, and the low gamma lookup table 440. The gamma generator 400 of FIG. 7 may correspond to the gamma generator 120 included in the display device 100 of FIG. 1. The gamma generator 400 of FIG. 7 may be substantially the same as or like the gamma generator 300 of FIG. 4 except that the gamma generator 400 includes the color detector 450.

The color detector 450 may convert the second image data in hue saturation value (HSV) color space and may output a color dividing control signal CDC to control the dividing ratio of a region that includes a HSV data detected based on a set or predetermined analyzing condition. The color detector 450 may receive the image data from the timing controller. The HSV color space is a non-independent coordinate based on hue, saturation, and value. The color detector 450 may convert the second image data in the HSV color space and generate the HSV data. When the HSV data satisfies the set or predetermined condition, the color detector 450 may output the color dividing control signal CDC to control the dividing ratio of the region including the HSV data. For example, the color detector 450 may convert the second image data to the HSV data in the HSV color space. When the HSV data includes a skin color, the color detector 450 may output the color dividing control signal CDC that controls the dividing ratio of the region that includes the HSV data. For example, the gamma generator 400 may divide the display panel into the first region and the second region. When the HSV data that satisfies the set or predetermined condition is included in the first region, the color detector 450 may output the color dividing control signal CDC that controls the dividing ratio of the first region.

The dividing ratio lookup table 410 may store the dividing ratio DR according to the position of the high sub-pixel and the low sub-pixel. The dividing ratio lookup table 410 may control the dividing ratio DR previously stored based on the color dividing control signal CDC from the color detector 450. For example, the dividing ratio lookup table 410 may increase or decrease the dividing ratio previously stored by 10% based on the color dividing control signal CDC.

Figure 8:
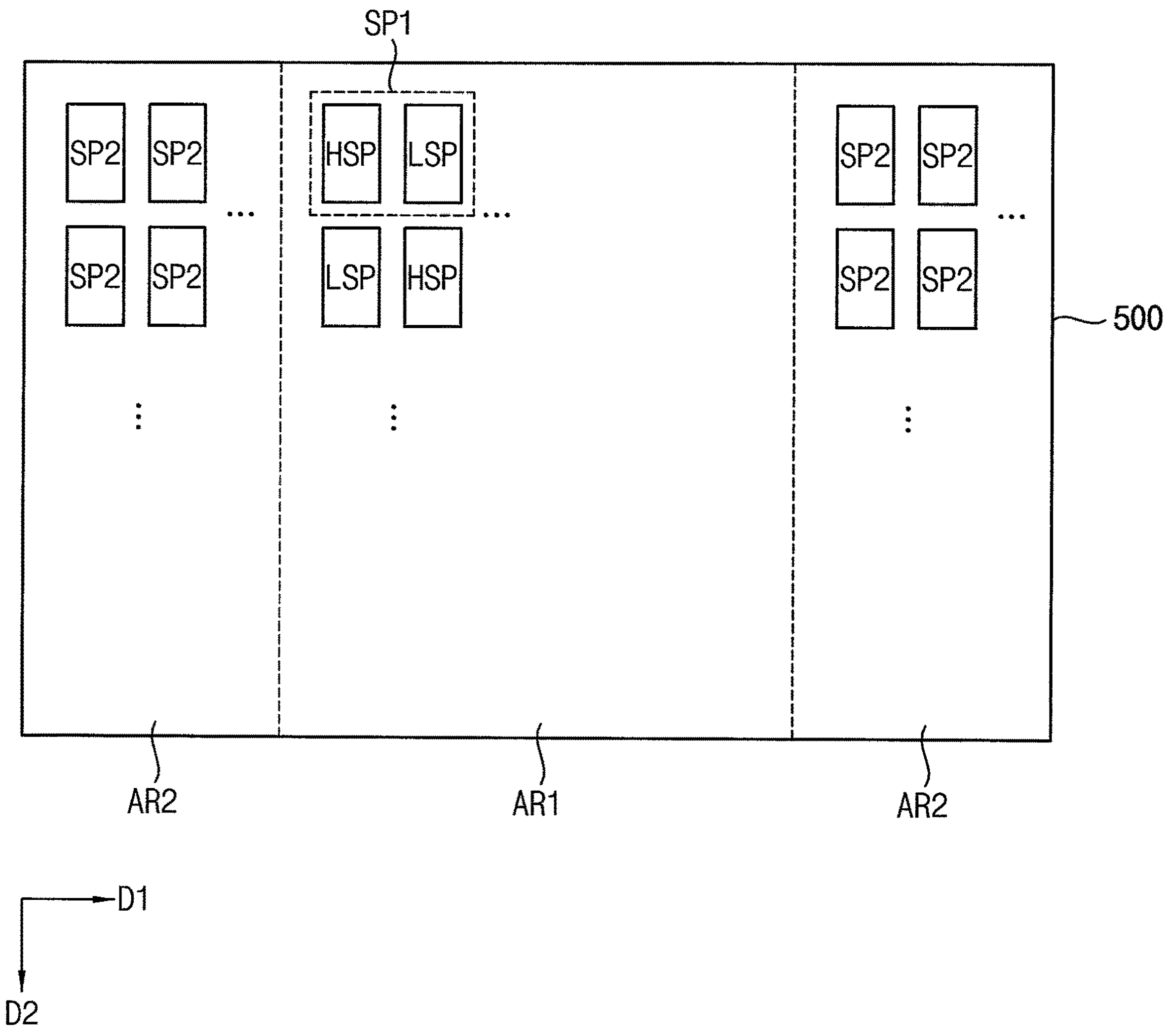
FIG. 8 is a diagram illustrating a display panel included in the display device of FIG. 1 according to example embodiments.
Figure 9A:
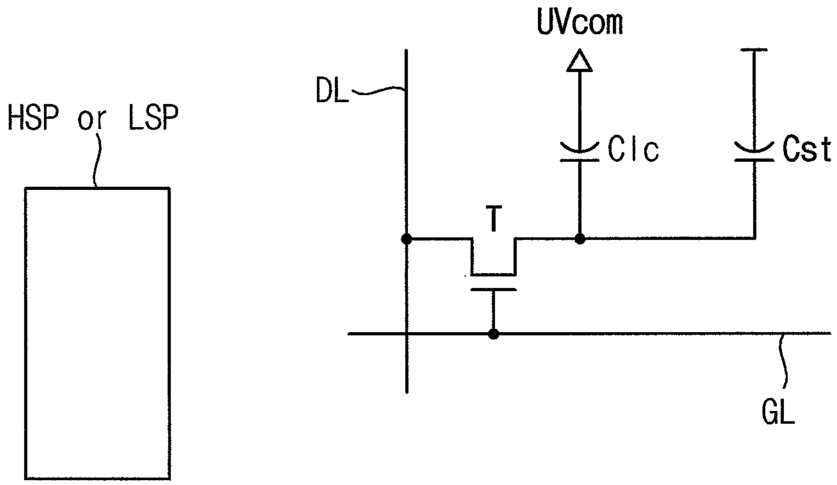
FIG. 9A is a circuit diagrams illustrating a first sub-pixel included in the display panel of FIG. 8 according to example embodiments.
Figure 9B:
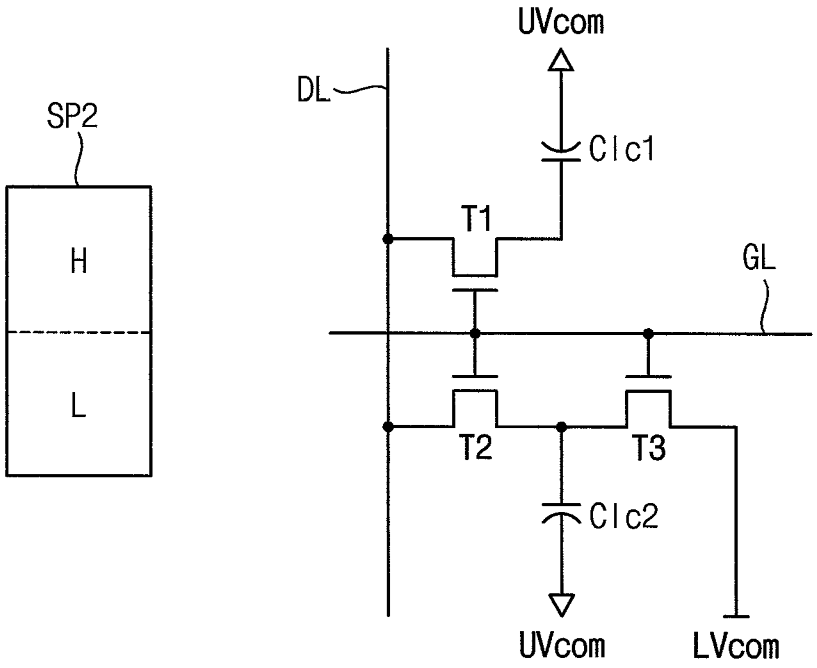
FIG. 9B is a circuit diagram illustrating a second sub-pixel included in the display panel of FIG. 8 according to example embodiments.

FIG. 8 is a diagram illustrating a display panel included in the display device of FIG. 1 according to an example embodiments. FIG. 9A is a circuit diagrams illustrating a first sub-pixel included in the display panel of FIG. 8 according to example embodiments. FIG. 9B is a circuit diagram illustrating a second sub-pixel included in the display panel of FIG. 8 according to example embodiments.

Referring to FIG. 8, the display panel 500 may further include the second sub-pixel SP2. That is, the display panel 500 may include the first sub-pixels SP1 and the second sub-pixels SP2. The display panel 500 of FIG. 8 may correspond to the display panel 110 included in the display device 100 of FIG. 1. The first sub-pixels SP1 may be formed in the first region AR1 of the display panel 500 and the second sub-pixels SP2 may be formed in the second region AR2 of the display panel 500. For example, the first region AR1 may correspond to the center of the display panel 500 and the second region AR2 may correspond to the outer edge of the display panel 500.

The first sub-pixels SP1 may be formed in the first region AR1 of the display panel 500. Each of the first sub-pixels SP1 may include the high sub-pixel HSP and the low sub-pixel LSP. For example, each of the high sub-pixel HSP and the low sub-pixel LSP may display or emit one selected from a red color light, a green color light, and a blue color light. Alternatively, each of the high sub-pixel HSP and the low sub-pixel LSP may display or emit one selected from a red color light, a green color light, a blue color light, and a white color light. The high sub-pixel HSP and the low sub-pixel LSP may be alternately formed in the first direction. The high sub-pixel HSP and the low sub-pixel LSP may be alternately formed in the second direction. Referring to FIG. 9A, the high sub-pixel HSP or the low sub-pixel LSP may include a switching transistor T coupled to the data line DL and the gate line GL, a liquid crystal capacitor Clc and the storage capacitor Cst electrically coupled to the switching transistor T. The high sub-pixel HSP may emit light in response to the high data voltage from the data driver and the low sub-pixel LSP may emit light in response to the low data voltage from the data driver.

The second sub-pixels SP2 may be formed in the second region AR2 of the display panel 500. For example, each of the second sub-pixels SP2 may display or emit one selected from a red color light, a green color light, and a blue color light. Alternatively, each of the second sub-pixels SP2 may display or emit one selected from a red color light, a green color light, a blue color light, and a white color light. The second sub-pixels SP2 may be formed in the first direction and the second direction. Referring to FIG. 9B, the second sub-pixel SP2 may include a high region H and a low region L. A first liquid crystal capacitor Clc1 coupled (e.g., electrically connected) to the data line DL via the first switching transistor T1 coupled to the gate line GL may be formed in the high region H. A second liquid crystal capacitor Clc2 coupled to the data line via a second switching transistor T2 coupled to the gate line GL, and coupled to a lower common voltage LVcom via a third switching transistor T3 coupled to the gate line GL and the second switching transistor T2 may be formed in the low region L. The first switching transistor T1 formed in the high region H may turn on in response to the gate signal provided through the gate line GL. When the first switching transistor T1 turns on, the first liquid crystal capacitor Clc1 may store a difference of an upper common voltage UVcom and the data voltage provided through the data line DL. The second switching transistor T2 and the third switching transistor T3 may turn on in response to the gate signal provided through the gate line GL. When the second switching transistor T2 turns on, the second liquid crystal capacitor Clc2 may store a difference of the upper common voltage UVcom and the data voltage. When the third switching transistor T3 turns on, a voltage stored in the second liquid crystal capacitor Clc2 may be divided. That is, the voltage stored in the second liquid capacitor Clc2 may be lower by a difference of the upper common voltage UVcom and the lower common voltage LVcom. As described above, the second sub-pixel SP2 may divide the data voltage provided through the data line DL so that the high region H and the low region L may emit light in different luminance (luminance amounts). A structure of the second sub-pixel SP2 may improve the visibility by emitting light for the high region H and the low region L in different luminance. However, an aperture ratio and a transmittance may be degraded. The display panel 500 according to example embodiments may improve the luminance of the center and visibility of the outer edge by disposing the second sub-pixels SP2 including the high region H and the low region L in the outer edge.

Figure 10:
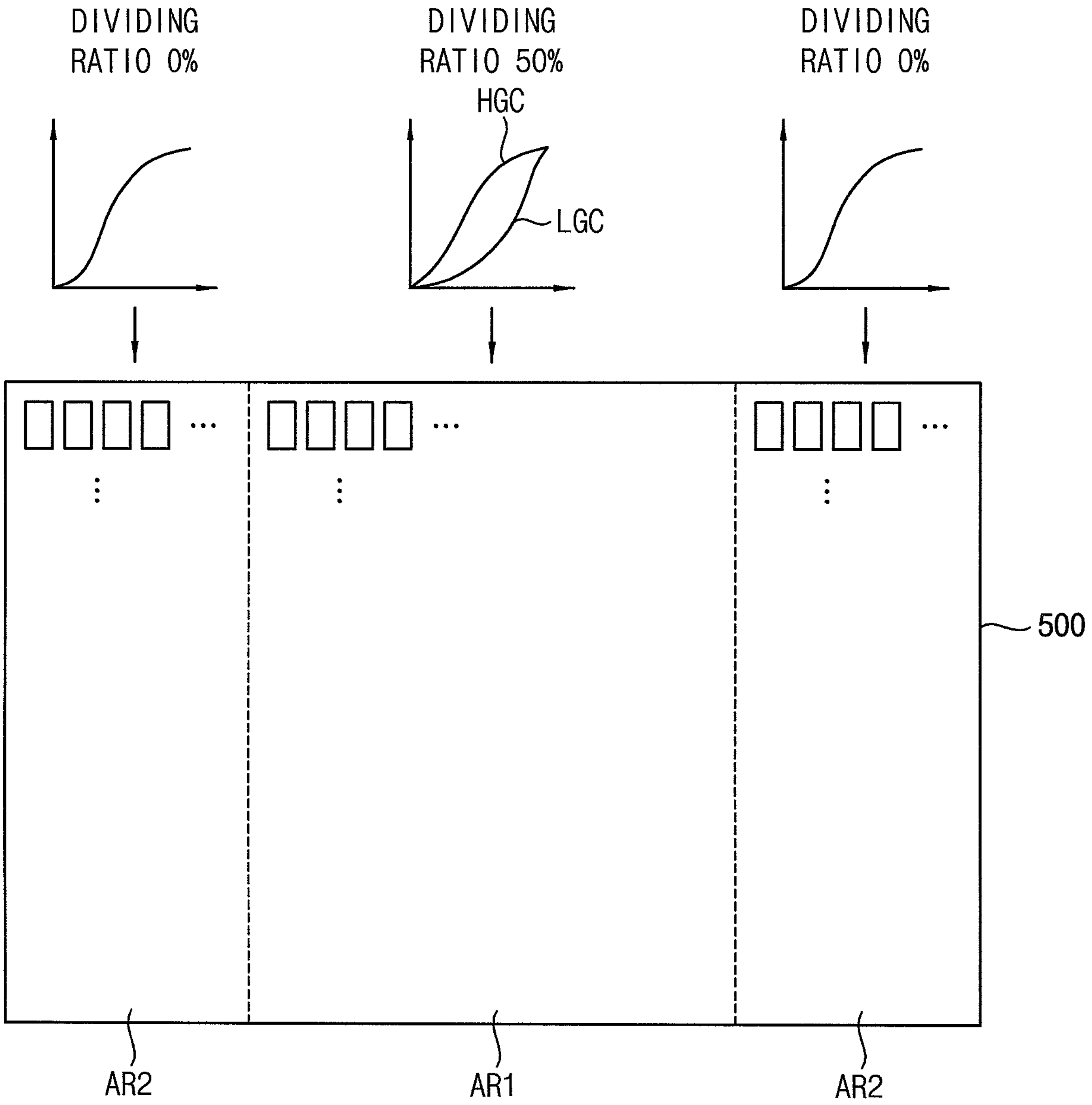
FIG. 10 is a diagram illustrating an operation of the gamma generator of FIG. 7 according to example embodiments.

FIG. 10 is a diagram illustrating an operation of the gamma generator of FIG. 7 according to example embodiments. FIG. 11 is a chart illustrating a dividing ratio lookup table included in the gamma generator of FIG. 7 according to example embodiments. FIG. 12 is a chart illustrating a gamma curve lookup table included in the gamma generator of FIG. 7 according to example embodiments.

Referring to FIG. 10, the gamma generator may apply a different high gamma curve and low gamma curve to the first region AR1 in which the first sub-pixels are formed and the second region AR2 in which the second sub-pixels are formed. Referring to FIG. 11, the dividing ratio lookup table 520 of the gamma generator may store the dividing ratio corresponding to the first region AR1 and the second region AR2. For example, the dividing ratio lookup table 520 may select the high gamma curve and the low gamma curve of which the dividing ratio is 50% for the first sub-pixel formed in the first area AR1 and may select the high gamma curve and the low gamma curve of which the dividing ratio is 0% for the second sub-pixel formed in the second area AR2. Referring to FIG. 12, the gamma curve lookup table 540 may store the high gamma curve and the low gamma curve corresponding to the dividing ratio of the gamma curve lookup table 540. When the dividing ratio is 0%, the gamma generator may select the high gamma curve and the low gamma curve of which the gamma curve (gamma curve value) is 2.2. When the dividing ratio is 50%, the gamma generator may select the high gamma curve of which the gamma curve is 2.4 and the low gamma curve of which the gamma curve is 2.0. Here, when the dividing ratio is 0%, the high gamma curve and the low gamma curve may coincide. When the high gamma curve and the low gamma curve coincide, the data driver may generate the high data voltage and the low data voltage having the same voltage level and provide one selected from the high data voltage and the low data voltage to the second sub-pixel. That is, the high data voltage and the low data voltage having the different voltage level may be provided to the first sub-pixel in the first region AR1 and the one selected from the high data voltage and the low data voltage having the same voltage level may be provided to the second sub-pixel in the second region AR2.

As described above, the transmittance of the center of the display panel 500 and the visibility of the outer edge of the display panel 500 may improve by forming the first sub-pixel including the high sub-pixel and the low sub-pixel in the center of the display panel 500 and the second sub-pixel including the high region and the low region in the outer edge of the display panel 500.

Figure 13:
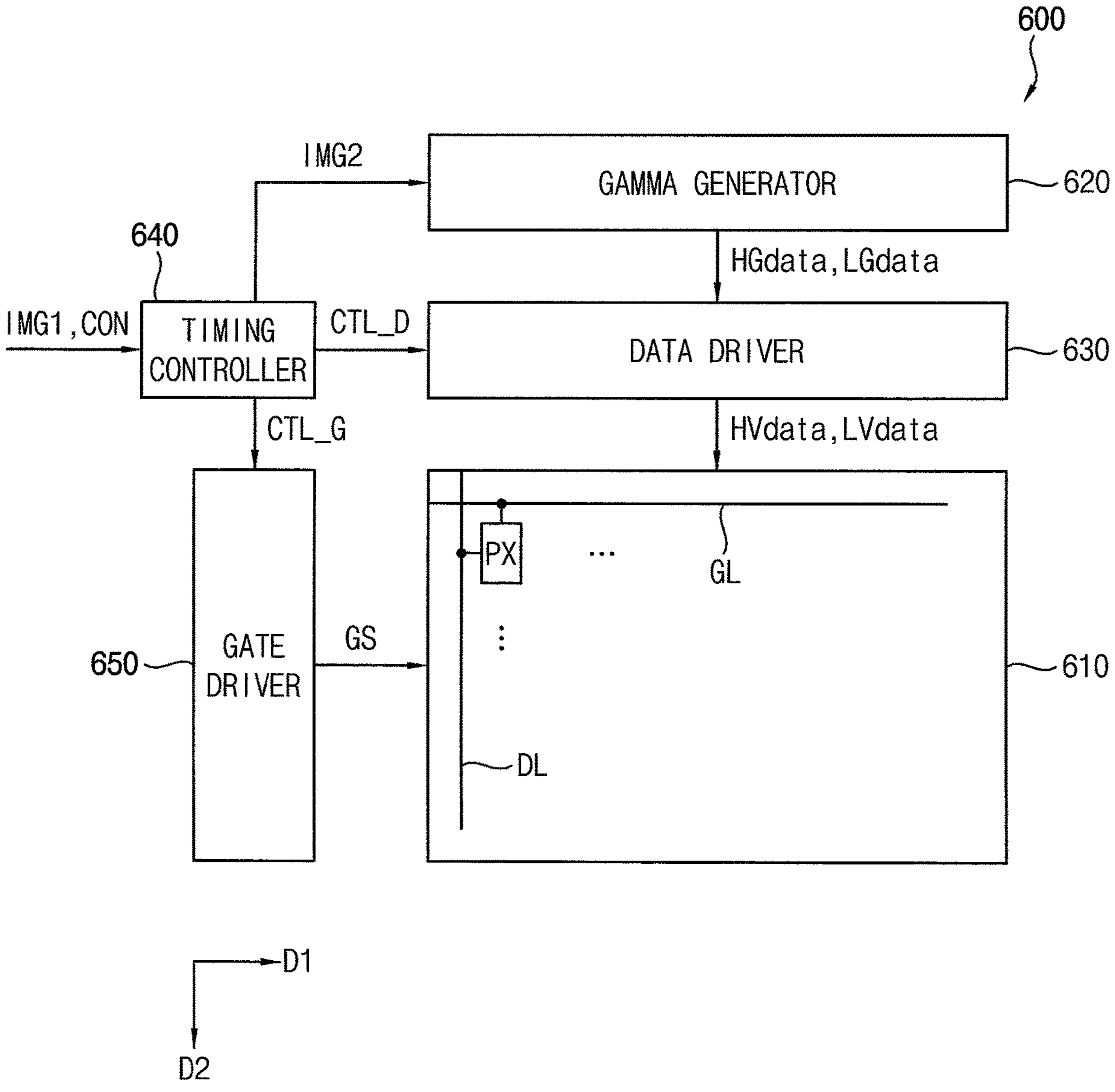
FIG. 13 is a block diagram illustrating a display device according to example embodiments.
Figure 14:
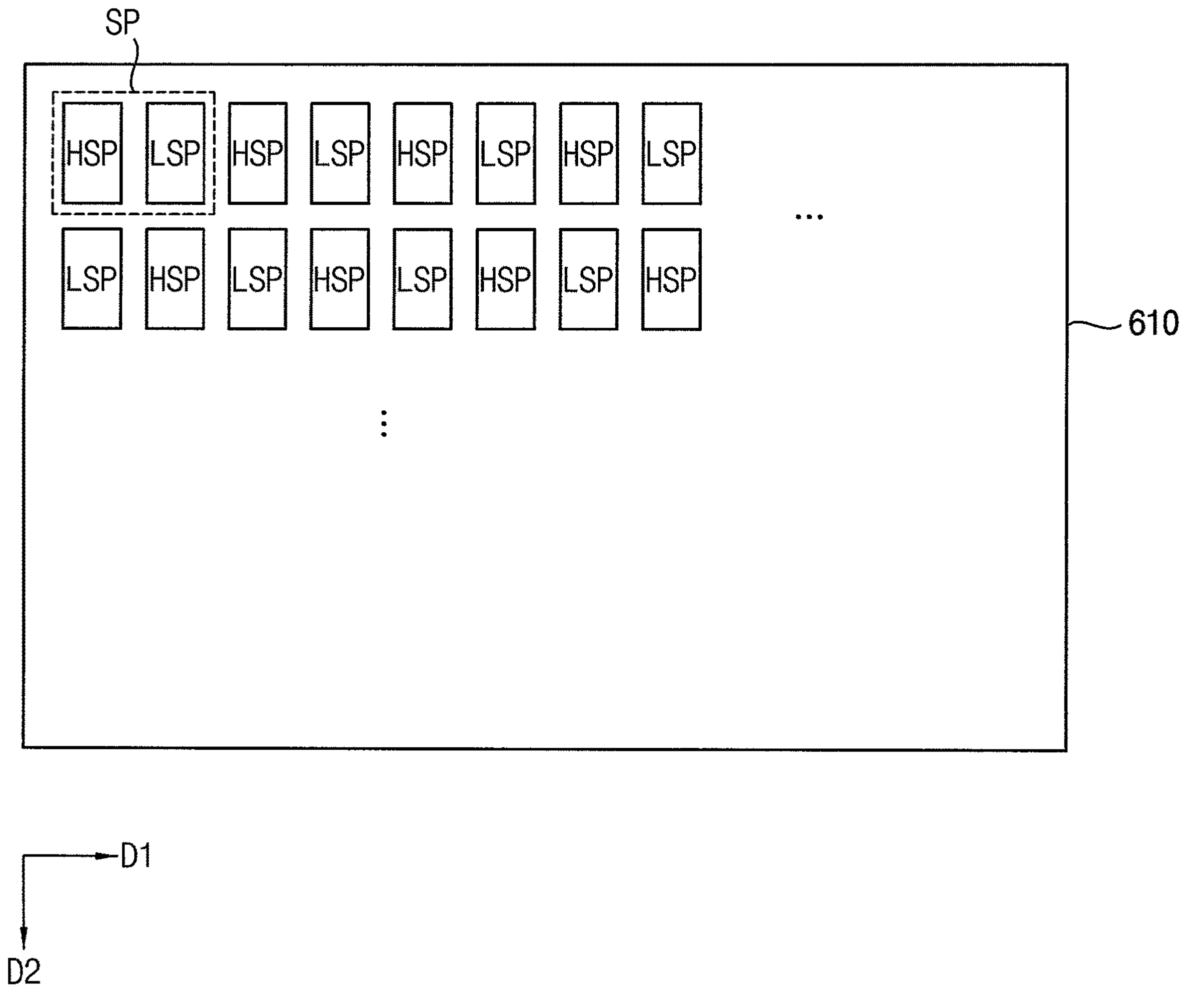
FIG. 14 is a diagram illustrating a display panel included in the display device of FIG. 13 according to example embodiments.

FIG. 13 is a block diagram illustrating a display device according to example embodiments. FIG. 14 is a diagram illustrating a display panel included in the display device of FIG. 13 according to example embodiments.

Referring to FIG. 13, the display device may include a display panel 610, a gamma generator 620, a data driver 630, a timing controller 640, and a gate driver 650.

The display panel 610 may include a plurality of data lines DL, a plurality of gate lines GL, and a plurality of pixels PX. Each of the pixels PX may be electrically coupled to the gate line GL and the data line DL. The gate lines GL may extend in a first direction D1 and be arranged with each other in a second direction D2 perpendicular to or crossing the first direction D1. The data lines DL may extend in the second direction D2 and be arranged with each other in the first direction D1. The first direction D1 may be parallel with a long side of the display panel 610, and the second direction D2 may be parallel with a short side of the display panel 610.

Referring to FIG. 14, display panel 610 may include sub-pixels SP. For example, each of the pixels PX may include at least one sub-pixel SP. Each of the sub-pixels SP may include a high sub-pixel HSP and a low sub-pixel LSP. For example, each of the high sub-pixel HSP and the low sub-pixel LSP may display or emit one selected from a red color light, a green color light, and a blue color light. Alternatively, each of the high sub-pixel HSP and the low sub-pixel LSP may display or emit one selected from a red color light, a green color light, a blue color light, and a white color light. The high sub-pixel HSP and the low sub-pixel LSP may be alternately formed in the first direction D1. The high sub-pixel HSP and the low sub-pixel LSP may be alternately formed in the second direction D2 perpendicular to or crossing the first direction D1. The high sub-pixel HSP may emit light in response to the high data voltage HVdata from the data driver 630 and the low sub-pixel may emit light in response to the low data voltage LVdata from the data driver 630.

The gamma generator 620 may receive a second image data IMG2 every frame, change a dividing ratio of a high gamma curve and a low gamma curve applied to the high sub-pixel HSP and the low sub-pixel LSP based on a luminance amount of the second image data IMG2, and may generate a high gamma data HGdata corresponding to the high gamma curve and a low gamma data LGdata corresponding to the low gamma curve. The gamma generator 620 may receive the second image data IMG2 every frame from the timing controller 640. The gamma generator 620 may analyze the luminance amount based on the second image data IMG2. For example, the gamma generator 620 may analyze the luminance amount of the second image data IMG2 using a histogram analysis. In some example embodiments, the gamma generator 620 may assign a weight according to a color of the second image data IMG2. For example, the gamma generator 620 may assign a weight to the red color and the blue color of the second image data IMG and analyze the luminance amount of the second image data IMG2. The gamma generator 620 may control the dividing ratio of the high gamma curve and the low gamma curve applied to the high sub-pixel HSP and the low sub-pixel LSP based on the luminance amount of the second image data IMG2. For example, the gamma generator 620 may increase the dividing ratio of the high gamma curve and the low gamma curve as the luminance amount of the second image data IMG2 increases. The gamma generator 620 may decrease the dividing ratio of the high gamma curve and the low gamma curve for the second image data IMG2 having a low luminance (i.e., a low grayscale or low gray level) and increase the dividing ratio of the high gamma curve and the low gamma curve for the second image data IMG2 having a high luminance (i.e., a high grayscale or high gray level) because a color coordinate deviation is large at the low grayscale and human eyes are sensitive to the low grayscale. Thus, display quality in the low grayscale may be improved.

In some example embodiments, the gamma generator 620 may further include a color detector. The color detector may convert the second image data IMG2 in HSV color space and may output a color dividing control signal to control the dividing ratio of a region that may include a HSV data detected based on a set or predetermined analyzing condition. The gamma generator 620 may control the dividing ratio of the high gamma curve and the low gamma curve based on the color dividing control signal.

The gamma generator 620 may generate the high gamma data HGdata corresponding to the high gamma curve and the low gamma data LGdata corresponding to the low gamma curve. The gamma generator 620 may provide the high gamma data HGdata and the low gamma data LGdata to the data driver 630.

The data driver 630 may convert the high gamma data HGdata and the low gamma data LGdata to the high data voltage HVdata and the low data voltage LVdata. The data driver 630 may generate the high data voltage HVdata based on the second image data IMG2 and the high gamma data HGdata and may generate the low data voltage LVdata based on the second image data IMG2 and the low gamma data LGdata. Here, a difference between the high data voltage HVdata and the low data voltage LVdata may increase as the dividing ratio of the high gamma curve and the low gamma curve increases. The data driver 630 may provide the high data voltage HVdata to the high sub-pixel HSP and the low data voltage LVdata to the low sub-pixel LSP.

The timing controller 640 may convert a first image data IMG1 to the second image data IMG2 and may generate a data control signal CTL_D and a gate control signal CTL_G to control a driving of the second image data IMG2.

Although the display device 600 that includes the gamma generator 620, the data driver 630, and the timing controller 640 is described in FIG. 13, the display device 600 is not limited thereto. For example, the gamma generator 620 may be located in the timing controller 640 or be located in the data driver 630.

The gate driver 650 may generate a gate signal GS based on the gate control signal CTL_G provided from the timing controller 640. The gate driver 650 may provide the gate signal GS to the sub-pixels formed in the display panel 610 through the gate lines GL.

As described above, the display device 600 according to example embodiments may improve the display quality by including sub-pixels that include the high sub-pixel HSP and the low sub-pixel LSP and may control the dividing ratio of the high gamma curve and the low gamma curve based on the luminance amount of the second image data IMG2.

Figure 15:
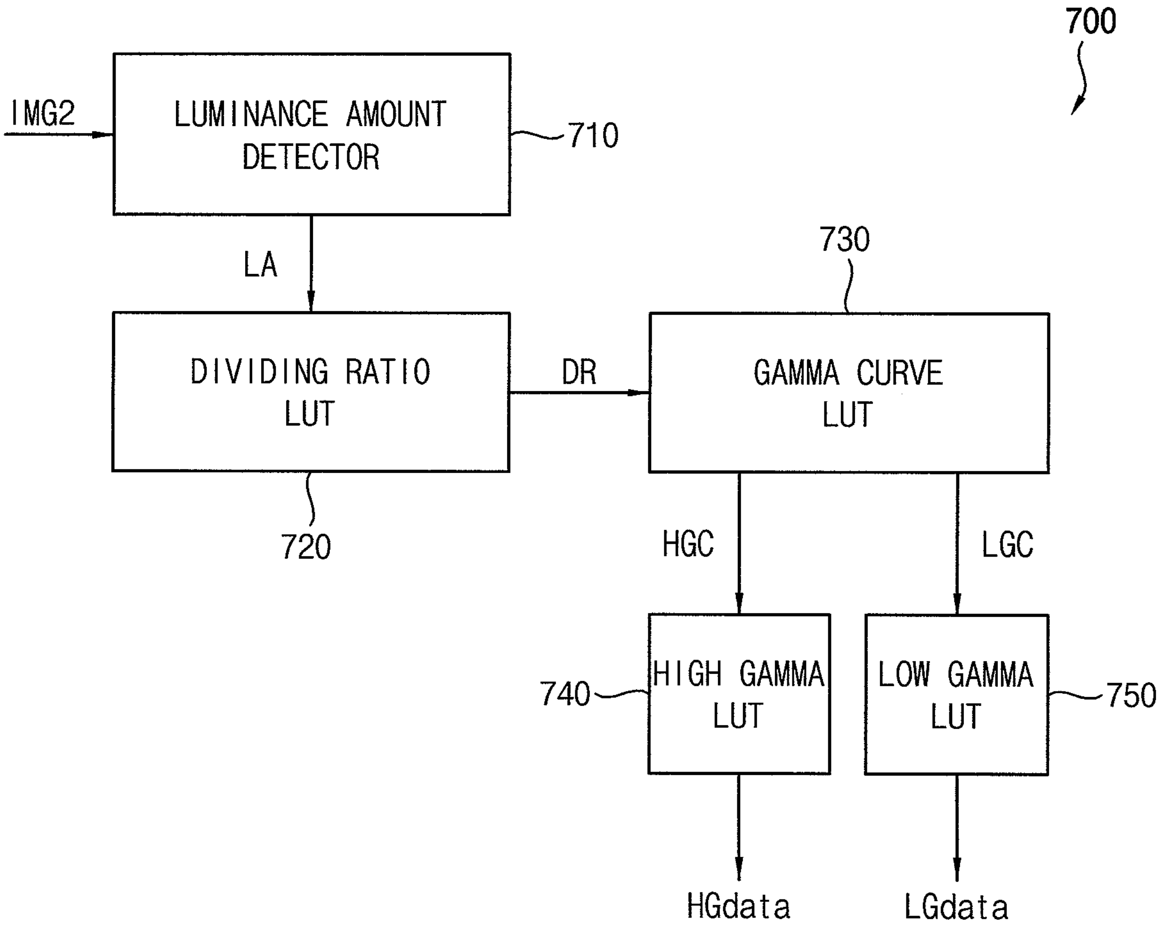
FIG. 15 is a block diagram illustrating a gamma generator included in the display device of FIG. 13 according to example embodiments.

FIG. 15 is a block diagram illustrating a gamma generator included in the display device of FIG. 13 according to example embodiments. FIG. 16 is a chart illustrating a dividing ratio lookup table included in the gamma generator of FIG. 15 according to example embodiments. FIG. 17 is a chart illustrating a gamma curve lookup table included in the gamma generator of FIG. 15 according to example embodiments.

Referring to FIG. 15, the gamma generator 700 may include a luminance amount detector 710, a dividing ratio lookup table 720, a gamma curve lookup table 730, a high gamma lookup table 740, and a low gamma lookup table 750. The gamma generator 700 of FIG. 15 may correspond to the gamma generator 620 included in the display device 600 of FIG. 13.

The luminance amount detector 710 may detect the luminance amount LA of the second image data IMG2. For example, the luminance amount detector 710 may analyze the luminance amount LA based on the histogram analysis that accumulates the gray level corresponding to the second image data IMG2. Alternatively, the luminance amount detector 710 may output an average value of the gray levels corresponding to the second image data IMG2 as the luminance amount LA.

The dividing ratio lookup table 720 may store the dividing ratio DR based on the luminance amount LA of the second image data IMG2. Referring to FIG. 16, the dividing ratio lookup table 720 may store the dividing ratios DR corresponding to a first luminance amount L1, a second luminance amount L2, and a third luminance amount L3 of the second image data IMG2. When the second image data IMG2 has the first luminance amount L1, the gamma generator 700 may select the dividing ratio 0%. When the second image data IMG2 has the second luminance amount L2, the gamma generator 700 may select the dividing ratio 50%. When the second image data IMG2 has the third luminance amount L3, the gamma generator 700 may select the dividing ratio 100%. For example, the first luminance amount L1 may correspond to 32 grayscale value (a gray level value of 32), the second luminance amount L2 may correspond to 128 grayscale value (a gray level value of 128), and the third luminance amount L3 may correspond to 256 grayscale (a gray level value of 256). Further, the gamma generator may select the dividing ratio DR of the second image data IMG2 having a luminance amount between the first luminance amount L1 and the second luminance amount L2 by interpolating the dividing ratios DR corresponding to the first luminance amount L1 and the second luminance amount L2. The gamma generator may select the dividing ratio DR of the second image data IMG2 having a luminance amount between the second luminance amount L2 and the third luminance amount L3 by interpolating the dividing ratios DR corresponding to the second luminance amount L2 and the third luminance amount L3.

The gamma curve lookup table 730 may store the high gamma curve HGC and the low gamma curve LGC corresponding to the dividing ratio DR. Referring to FIG. 17, the gamma curve lookup table 730 may store the high gamma curve HGC and the low gamma curve LGC in case that the dividing ratios DR are 0%, 50%, and 100%. For example, when the dividing ratio DR is 0%, the gamma generator 700 may select the high gamma curve HGC and the low gamma curve LGC of which the gamma curves are 2.2. In this case, the high gamma curve HGC and the low gamma curve LGC may be the same. When the dividing ratio DR is 50%, the gamma generator 700 may select the high gamma curve HGC of which the gamma curve is 2.4 and the low gamma curve LGC of which the gamma curve is 2.0. When the dividing ratio DR is 100%, the gamma generator 700 may select the high gamma curve HGC of which the gamma curve is 2.8 and the low gamma curve LGC of which the gamma curve is 1.6.

The high gamma lookup table 740 may store the high gamma data HGdata for each gray level based on the high gamma curve HGC. The high gamma lookup table 740 may output the high gamma data HGdata for each gray level to the data driver based on the high gamma curve HGC having the gamma curve selected in the gamma curve lookup table 730.

The low gamma lookup table 750 may store the low gamma data LGdata for each gray level based on the low gamma curve LGC. The low gamma lookup table 750 may output the low gamma data LGdata for each gray level to the data driver based on the low gamma curve LGC having the gamma curve selected in the gamma curve lookup table 730.

The present inventive concept may be applied to a display device and an electronic device having the display device. For example, the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

It will be understood that, although the terms “first”, “second”, “third”, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Further, the use of “may” when describing embodiments of the inventive concept refers to “one or more embodiments of the inventive concept.”

It will be understood that when an element or layer is referred to as being “on” or “coupled to” another element or layer, it can be directly on or coupled to the other element or layer, or one or more intervening elements or layers may be present. In contrast, when an element or layer is referred to as being “directly on” or “directly coupled to” another element or layer, there are no intervening elements or layers present.

As used herein, the term “substantially” and similar terms are used as terms of approximation and not as terms of degree, and are intended to account for the inherent deviations in measured or calculated values that would be recognized by those of ordinary skill in the art.

The display devices and/or any other relevant devices or components according to embodiments of the present disclosure described herein, such as, for example, a timing controller, a gamma generator, a data driver, and a gate driver, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of ordinary skill in the art should recognize that the functionality of various computing/electronic devices may be combined or integrated into a single computing/electronic device, or the functionality of a particular computing/electronic device may be distributed across one or more other computing/electronic devices without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and equivalents thereof.

What is claimed is:

1. A display device comprising:

a display panel comprising a plurality of first sub-pixels, a first sub-pixel of the plurality of first sub-pixels comprising a high sub-pixel and a low sub-pixel;

a gamma generator configured to change a dividing ratio of a high gamma curve and a low gamma curve applied to the high sub-pixel and the low sub-pixel based on a position of the first sub-pixel and to generate a high gamma data corresponding to the high gamma curve and a low gamma data corresponding to the low gamma curve; and a data driver configured to convert the high gamma data and the low gamma data to a high data voltage and a low data voltage wherein the gamma generator comprises:

a memory device corresponding to a dividing ratio lookup table configured to change the dividing ratio by outputting a dividing ratio to a memory device corresponding to a gamma curve lookup table according to the position of the first sub-pixel; and the memory device corresponding to the gamma curve lookup table configured to output the high gamma curve and the low gamma curve according to the dividing ratio received from the memory device corresponding to the dividing ratio lookup table, the high gamma curve and the low gamma curve being utilized to generate the high gamma data and the low gamma data to be output to the data driver.

2. The display device of claim 1, wherein the high sub-pixel and the low sub-pixel are alternately arranged in a first direction and the high sub-pixel and the low sub-pixel are alternately arranged in a second direction crossing the first direction.

3. The display device of claim 1, wherein the gamma generator is configured to divide the display panel into a plurality of regions and to generate a dividing ratio of the high gamma curve and the low gamma curve which is different for each region of the plurality of regions and to apply the high gamma curve and the low gamma curve to the high sub-pixel and the low sub-pixel in each of the regions.

4. A display device comprising:

a display panel comprising a plurality of first sub-pixels, a first sub-pixel of the plurality of first sub-pixels comprising a high sub-pixel and a low sub-pixel;

a gamma generator configured to change a dividing ratio of a high gamma curve and a low gamma curve applied to the high sub-pixel and the low sub-pixel based on a position of the first sub-pixel and to generate a high gamma data corresponding to the high gamma curve and a low gamma data corresponding to the low gamma curve; and a data driver configured to convert the high gamma data and the low gamma data to a high data voltage and a low data voltage, wherein the gamma generator is configured to divide the display panel into a plurality of regions and to generate a dividing ratio of the high gamma curve and the low gamma curve which is different for each region of the plurality of regions and to apply the high gamma curve and the low gamma curve to the high sub-pixel and the low sub-pixel in each of the regions, and wherein the gamma generator is configured to generate a dividing ratio of the high gamma curve and the low gamma curve applied to the high sub-pixel and the low sub-pixel at a center of the display panel to have a lower value than the dividing ratio of the high gamma curve and the low gamma curve applied to the high sub-pixel and the low sub-pixel at an outer edge of the display panel.

5. The display device of claim 1, wherein the gamma generator is configured to gradually change the dividing ratio of the high gamma curve and the low gamma curve based on the position of the first sub-pixel.

6. The display device of claim 1, wherein the display panel further comprises:

a second sub-pixel having a high region and a low region.

7. The display device of claim 6, wherein the first sub-pixel is in a first region of the display panel and the second sub-pixel is in a second region of the display panel.

8. The display device of claim 6, wherein the first sub-pixel is at a center of the display panel and the second sub-pixel is at an outer edge of the display panel.

9. The display device of claim 6, wherein the gamma generator is configured to generate the high gamma data and the low gamma data based on the high gamma curve and the low gamma curve of which the dividing ratio is zero, and wherein the data driver is configured to generate the high data voltage and the low data voltage having the same level based on the high gamma data and the low gamma data and to provide one selected from the high data voltage and the low data voltage to the second sub-pixel.

10. The display device of claim 1, wherein:

the memory device corresponding to the dividing ratio lookup table is further configured to store the dividing ratio corresponding to the position of the first sub-pixel; and the memory device corresponding to the gamma curve lookup table is further configured to store the high gamma curve and the low gamma curve corresponding to the dividing ratio.

11. The display device of claim 1, wherein the gamma generator further comprises:

a memory device corresponding to a high gamma lookup table configured to store the high gamma data for each gray level based on the high gamma curve; and a memory device corresponding to a low gamma lookup table configured to store the low gamma data for each gray level based on the low gamma curve.

12. The display device of claim 1, wherein the gamma generator further comprises:

a color detector configured to convert an image data in hue saturation value (HSV) color space and to output a color dividing control signal to control the dividing ratio of a region that corresponds to HSV data detected based on a set analyzing condition.

13. The display device of claim 12, wherein the gamma generator is configured to control the dividing ratio of the high gamma curve and the low gamma curve based on the color dividing control signal.

14. A display device comprising:

a display panel comprising a sub-pixel that comprises a high sub-pixel and a low sub-pixel;

a gamma generator configured to receive an image data per frame, to change a dividing ratio of a high gamma curve and a low gamma curve applied to the high sub-pixel and the low sub-pixel based on a luminance amount of the image data, and to generate high gamma data corresponding to the high gamma curve and low gamma data corresponding to the low gamma curve; and a data driver configured to convert the high gamma data and the low gamma data to a high data voltage and a low data voltage, wherein the gamma generator comprises:

a memory device corresponding to a high gamma lookup table configured to receive the high gamma curve, to generate the high gamma data for each gray level based on the high gamma curve, and to output the high gamma data to the data driver; and a memory device corresponding to a low gamma lookup table configured to receive the low gamma curve, to generate the low gamma data for each gray level based on the low gamma curve, and to output the low gamma data to the data driver.

15. The display device of claim 14, wherein the gamma generator is configured to increase the dividing ratio of the high gamma curve and the low gamma curve as the luminance amount of the image data increases.

16. The display device of claim 14, wherein the gamma generator is configured to assign a weight according to a color of the image data.

17. The display device of claim 14, wherein the gamma generator is configured to analyze the luminance amount of the image data through a histogram analysis.

18. The display device of claim 14, wherein the gamma generator further comprises:

a luminance detector configured to detect the luminance amount of the image data;

a memory device corresponding to a dividing ratio lookup table configured to store the dividing ratio corresponding to the luminance amount of the image data; and a memory device corresponding to a gamma curve lookup table configured to store the high gamma curve and the low gamma curve corresponding to the dividing ratio.

19. The display device of claim 14, wherein:

the memory device corresponding to the high gamma lookup table is further configured to store the high gamma data for each gray level based on the high gamma curve; and the memory device corresponding to the low gamma lookup table is further configured to store the low gamma data for each gray level based on the low gamma curve.

20. The display device of claim 14, wherein the gamma generator further comprises:

a color detector configured to convert the image data in hue saturation value (HSV) color space and to output a color dividing control signal to control the dividing ratio of a region that corresponds to HSV data detected based on a set analyzing condition, and wherein the gamma generator is configured to control the dividing ratio of the high gamma curve and the low gamma curve based on the color dividing control signal.

* * * * *